Patented May 27, 1924.

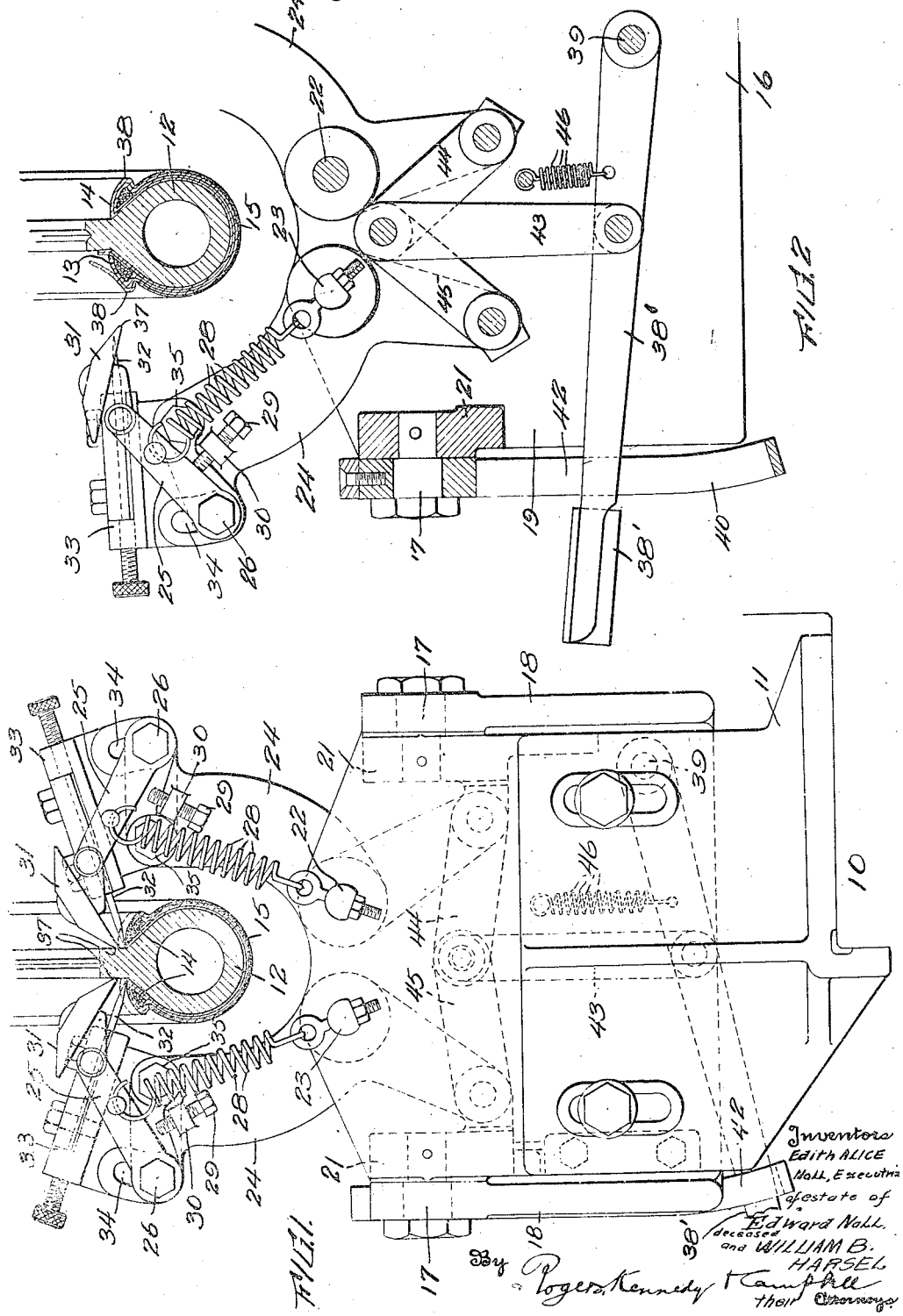

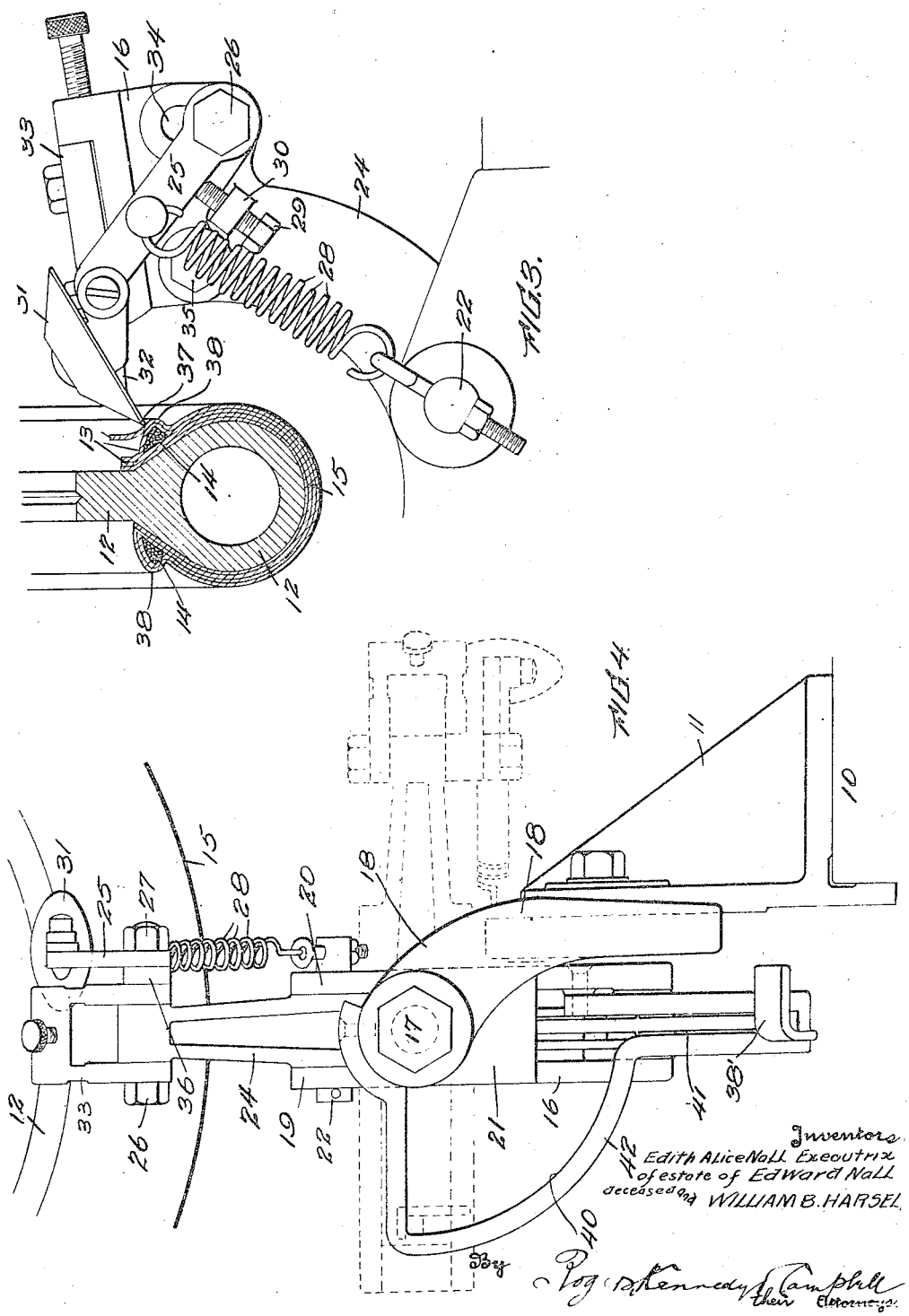

1,495,344

UNITED STATES PATENT OFFICE.

WILLIAM B. HARSEL, OF AKRON, OHIO, AND EDWARD NALL, DECEASED, BY EDITH ALICE NALL, EXECUTRIX, OF AKRON, OHIO, ASSIGNORS TO THE GOODYEAR TIRE & RUBBER COMPANY, OF AKRON, OHIO, A CORPORATION OF OHIO.

TIRE-MAKING MACHINE.

Application filed October 26, 1918, Serial No. 259,833. Renewed November 5, 1923.

*To all whom it may concern:*

Be it known that the undersigned, WILLIAM B. HARSEL, a citizen of the United States, residing at Akron, in the county of Summit and State of Ohio, and EDWARD NALL (whose executrix is the undersigned, EDITH ALICE NALL, also a citizen of the United States, residing at Akron, in the county of Summit and State of Ohio), did invent certain new and useful Improvements in Tire-Making Machines, of which the following is a specification, reference being had therein to the accompanying drawings.

Our present invention primarily relates to tire-making machines, and more particularly to stitcher-mechanism therefor; as well as to an improved method of laying fabric plies over the beads in the construction of a tire-carcass.

Though its application is unrestricted, the mechanism of our invention is especially applicable for use as an auxiliary stitcher to carry out a novel method of stitching the fabric plies over the toe-face of the bead.

It is contemplated among the objects of the present invention to mount, for use in conjunction with mechanism for stitching fabric plies on a ring-core or the like, an auxiliary stitcher disposed in operative relation to the ring core so that the stitcher may be swung into engagement therewith to smooth down fabric plies on the bead and then to be swung out of engagement with the core; the operation being such that the stitcher may travel around the bead and particularly the toe-face thereof so as to properly to lay the fabric thereon. The structure may include the stitcher and a trimming device so arranged in relation to the core that the stitcher may operate in the normal manner to lay the fabric across the toe-face of the bead, and then the trimmer will be positioned in relation to the core to automatically trim the excess of fabric.

It is contemplated as a further object to provide means for utilizing the stitcher to hold the excess fabric securely against the side of the core during the trimming operation; also means for regulating the travel of the stitcher and its tension; and also to provide for facilitating the removal of the trimmer knife for sharpening and replacement.

Still a further object is to effect an improvement in the method of laying tire fabric on a core in the building of a tire carcass or the like, so that, instead of laying each ply directly over the bead and across the toe-face thereof, a plurality of fabric plies may, at one operation, be carried over and laid upon the bead and the trimming thereof effected automatically and as a continuation of the fabric laying operations when the fabric has been so disposed on the bead.

Additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which similar reference numbers designate corresponding parts:

Figure 1 is a front elevational view of a portion of a tire building machine embodying our invention; Figure 2 is a fragmentary view in front elevation and partly in section, showing the mechanism at one side of the core in inactive position; Figure 3 is a similar view showing the stitcher device swung into its active position; and Figure 4 is a side elevational view showing the trimmer in active position, the stitcher then operating as a fabric holding instrumentality.

In these drawings, the reference numeral 10 designates a base or standard which in this instance constitutes a portion of the frame of a tire building machine. Upon this base is rotatably mounted a ring core 12, of the usual or any approved form and operated by any suitable means, upon which fabric plies 13 and beads 14 have been laid, (see Figure 3), for building a tire carcass 15. Upon the standard 10 is mounted, preferably adjustably, a bracket 11 which carries the stitching and trimming devices. The latter are preferably mounted on a pivoted support 16 provided with pivots 17 which bear in arms 18 at the sides of the bracket 11. The frame 16 preferably comprises spaced plates 19 and 20 secured to end pieces 21 mounted on the pivots 17.

On pivots 22 and 23, bearing in the plates 19 and 20, are mounted a pair of angular arms 24 carrying stitcher arms 25 hingeably connected to pins 26 which pass through the arms 24 and have thereon the nuts 27.

Retracting springs 28 connected to the stitcher arms 25 and the pivots 22 and 23 of arms 24 normally hold the stitcher arms 25 against adjustable stops 29 threaded in lugs 30 on the arms 24. The stitcher arms 25 have rotatably mounted thereon the stitcher disks or rolls 31.

The trimming devices preferably comprise cutter blades 32 replaceably and adjustably mounted in holders 33 arranged on the arms 24. The cutter blades 32 project inwardly toward the core 12, as shown, but normally do not extend as far as the periphery of the stitcher disks 31.

The blade holders 33 in this instance are adjustably mounted on the arms 24; one end being provided with slots 34 through which the pins 26 pass, and the other end portion being pivoted on bolts 35. Spacing bars 36 are mounted on the pins 26 and disposed between the blade holders 33 and the stitcher arms 25. (After the proper adjustment of the blade holders 33 is obtained the nuts 27 on the pins 26 and the nuts on the bolts 35 are tightened to maintain the holders in adjusted positions on the arms 24.)

The stitcher and trimmer, being both carried by the swinging support 16, are thus mounted for movement simultaneously toward and away from the core; but as will presently be explained, the trimmer may have movement (with the arms 24) independently of the stitcher.

The stitcher disk 31 is of the usual truncated cone shape, and its inner edge 37 is arranged so as to be in approximate alignment with the bead toe 38 of the tire carcass 15 on the core 12. This inner edge 37, then, normally overhangs the cutting edge of the blade 32.

It will be understood that there is one of these stitching and trimming structures at each side of the core, they being actuatable toward and away from the core and, thus, toward and away from each other.

Means are provided for effecting movement of the swingable support 16 from the horizontal to the upright position, and for moving the stitcher and trimming devices in the direction of the core, and such means may comprise a foot lever 38' connected by pivot 39 to the swingable support 16 and adapted to follow the curved portion 40 of a guide 42 when the swingable support 16 is moved to the upright position, and follow the straight portion 41 of said guide 42 when the stitcher and trimmer are moved toward or away from the core 12; said foot lever 38', by means of links 43, 44 and 45, having a toggle connection with the arms 24. A retracting spring 46 is connected between the foot lever 38' and the plate 19 of the swingable support 16.

With the parts in their inactive position, shown in Figures 2 and 3 for instance, pressure of the foot lever 38' for a certain distance will carry the plies 13 across the toe faces 38 of the beads 14, and lay the plies securely thereon. Any excess fabric will be pressed against the side of the core 12 by the edges 37 of the stitcher 31. After the stitchers have functioned to lay the plies 13 on the beads 14 a continuation of the pressure on the foot lever will result in moving the arms 25 inwardly of the core 12—stretching the springs 28—and will force the cutting edges of the blades 32 through the surplus fabric of the plies; the edges 37 of the stitcher 31 acting (during this operation) as a holding means for the surplus fabric. Rotation of the core will, of course, be occurring to effect a trimming of this surplus.

In general practice, any required number of fabric plies for building the tire carcass 15 may be stitched down in any preferred manner and by any of the well known or other stitching mechanisms to make the carcass; then, the beads having been properly positioned on the side of the carcass, the devices constituting the structure of the present invention are brought into play. To this end, the tire builder actuates the foot lever 38' to engage the stitcher 31 with the first fabric ply, which is to overlie the beads 14. These stitchers 31 then operate to lay the fabric nicely about the beads 14, at each side of the carcass; it being understood, of course, that the core is then rotating at relatively high speed. The arc of movement of the stitchers 31 with respect to the beads 14 on the carcass, is such as to cause them to traverse the toe faces until the stitchers reach the opposite edges of the beads, whereupon the stitchers come to rest and become fabric holders. Then, a continuation of the movement of the arms 24, under the influence of the foot lever 38', causes the trimmers to move while the stitchers remain at rest—in respect to further movement of the stitchers transversely of the core 12—although the stitchers are rotatably pressed against the fabric on the rotating core. The trimmer is thereby caused to engage and cut the fabric and, thus, sever the surplus of the fabric from the carcass. It will, therefore, be perceived that the positioning and action of the trimmers are effected automatically when the stitchers become active as a fabric laying and holding instrumentality.

By means of the adjustable stops 29, the relative initial angle and extent of movement of the arms 25 may be varied at the with of the operator and thus the action of the stitchers on the fabric, as it is being laid down about the beads, is definitely predetermined and controlled.

From the foregoing, it will be perceived that this structure provides a simple but effective mechanism for accomplishing the stitching and trimming steps, successively, during the so-called "over-bead" operation by means which are actuated by an instrumentality—the foot lever, for instance—common to both the stitcher and trimmer devices; the movement of that instrumentality to a prescribed point effecting the action of the stitcher device and, then, the further movement of that instrumentality effecting the action of the trimming device. So far as we are aware, we are the first to propose such a construction and aggroupment of the parts that the successive actions of the stitching and trimming devices acting under the control of means common to both may be effected.

By mounting the stitchers in their peculiar association with the trimmers, as above described, it is possible to stitch the single ply which goes, or the two plies which go, over the beads of the tire, down one after the other through the use of the main stitchers (not here shown). In the method, as practiced in connection with our present structure, these main stitchers carry the outside plies only down into the valley of each bead and to the outside thereof and are, then, immediately retracted. Thus, the last two plies (or three or more) are then operated on by the auxiliary stitchers above described. After the main stitchers have been used in the construction of the carcass and up to a point where the extreme edge portions of the two plies of fabric are free of the toes of the beads, they must then be simultaneously stitched across the toe faces of the beads. The auxiliary stitchers then become effective to carry the edge portions of the two plies across the beads at one time, and this movement is immediately followed by the action of the trimmers.

The essential novelty of our improved method, therefore, resides in the fact that whereas, under the prior general practice, each ply of fabric which went over the bead was completely stitched thereover and across the toe spaces before the next ply was put on the tire carcass; under the present practice (of our method) the operator is not obliged to carry each ply across the toe spaces of the beads, but stops in his stitching operation when he gets to the outside edges of the beads. Thereupon, the two or more plies which go over the beads are then stitched at the bead-face portions, all in a single operation by the auxiliary stitchers, whereupon the surplus fabric is successively trimmed off.

What we claim is:

1. In a tire-building machine, a core, stitching and trimming mechanisms operatively associated therewith, and a supporting-structure common to both mechanisms whereby movement of the supporting-structure effects a positioning movement of both mechanisms simultaneously in relation to the core, and, then, a successive movement of one in relation to the other at the will of the operator the trimming-mechanism being also movable on the structure at the will of the operator and while the stitching-mechanism is at rest.

2. A tire-building machine including a rotatable core, a support juxtaposed thereto, a stitcher-device on the support and movable thereby in relation to the core, and a fabric-trimming device also on the support and movable thereby and with the stitcher-device in respect to the core and having movement with the support under the control of the operator and independently of and while the stitching device is at rest; the support being common to both devices and movable in respect to the core to effect a simultaneous positioning of the devices toward and away from the core.

3. A tire-building machine including a rotatable core, a swinging support juxtaposed thereto, a stitcher-device mounted thereon for movement therewith in respect to the core and being itself movable on the support, and a trimming device on the support and positionable thereby in relation to the core; the support being common to both devices and movable in respect to the core to effect a simultaneous positioning of the devices toward and away from the core.

4. A tire-building machine including a rotatable core, a supporting member swingingly associated with the core, an arm swingingly associated with the member, a stitcher-device on the arm, and a trimming device on the member and positionable thereby in relation to the core; the member being common to both devices whereby its movement in respect to the core effects a positioning of the devices simultaneously in relation thereto.

5. A tire-building machine including a rotatable core, a supporting member swingingly associated with the core, an arm swingingly associated with the member, a stitcher-device on the arm, a trimming device on the member and positionable thereby in relation to the core, and a device for predetermining the extent of movement of the arm in one direction.

6. A tire-building machine including a rotatable core, a supporting member swingingly associated with the core, an arm swingingly associated with the member, a stitcher-device on the arm, a trimming device on the member and positionable thereby in relation to the core, a device for predetermining the extent of movement of the arm in one direction, and resilient means active on the arm to maintain it normally in engagement with said device.

7. A tire-building machine including a rotatable core, a support juxtaposed thereto, a stitcher-device on the support and movable thereby in relation to the core, a fabric-trimming device also on the support and movable thereby and with the stitcher-device in respect to the core and having movement with the support under the control of the operator and while the stitcher-device is at rest, said continued movement of the trimming-device being under the control of the operator, the support being common both to the stitcher-device and to the trimming-device and functioning to effect a positioning thereof in operating relation to the core, and means actuatable at the will of the operator for actuating said support.

8. A tire-building machine including a rotatable core, a pair of swinging members associated with the core at opposite sides thereof, means common to both of the pair of members for moving them simultaneously toward and away from each other and, thus, toward and away from the core, a stitcher-supporting arm on each member, a stitcher on the arm, a trimming device on the member, a limiting stop on the member for the arm, and means for normally holding the arm against the stop.

9. A tire-building machine including a rotatable core, a member having a to-and-fro movement in respect thereto, a stitcher-device mounted thereon and having movement therewith to a predetermined position whereupon it comes to rest, and a trimming device mounted on the member and made active thereby with respect to the core when the stitcher device comes to rest.

10. A structure including a rotatable member, a support having a to-and-fro movement in respect thereto, a fabric-rolling device carried thereby and adapted to have a predetermined movement with said support and then come to a position of rest, and a fabric-trimming device also mounted on the support and operable thereby for first a positioning movement with the rolling device in respect to the member, and, then, a continued movement on the member when the rolling device comes to rest.

11. A tire-building machine including a core, a stitcher and a trimmer movable with relation to the core, means for moving the stitcher into proximity to the core, and means operable upon continuation of the movement of the stitcher for moving the trimmer into proximity to the core.

12. A tire-building machine including a base, a rotatable ring-core associated therewith, a member pivotally mounted at one end upon said base and having at its opposite end a trimming device, a stitcher also mounted on said member in spaced relation to said trimming device, means for effecting movement of said stitcher into engagement with said core and operable upon further movement of the member to carry the trimming device into active position with respect to the core.

13. A tire-building machine including a base, a rotatable ring-core, a member pivotally mounted at one end upon said base and having at its opposite end a trimming device, a stitcher mounted on said member in spaced relation to said trimming device, means for effecting movement of said stitcher into engagement with said core and operable upon further movement of the member to carry the trimming device into proximity to the core, and means for varying the movement of the stitcher with relation to the member.

14. A tire-building machine including a base, a rotatable ring-core, a member pivotally mounted adjacent one end upon said base and having adjacent its opposite end a trimming device, an arm pivoted on the member, a stitcher mounted on said arm in spaced relation to said trimming device, means for effecting movement of said stitcher into engagement with said core, and operable to carry the trimming device into proximity to the core, means for varying the extent of movement of the stitcher-supporting arm with relation to the member, and means normally holding the stitcher-supporting arm at the limit of its movement in one direction.

15. In a tire-building machine, a combined stitching and trimming mechanism including a shiftable support, a stitcher-device carried thereby, and a trimming device also carried thereby; both of said devices having a positioning movement with the support and one of said devices having movement on the support independently of the other device whereby it may be actuated into an active position at the will of the operator successively to the positioning movement of the other device and while that other device remains passive.

16. In a tire-building machine, a combined stitching and trimming mechanism including a stitching device, a trimming device, a support common to both devices, and means for actuating said support to effect movement of both devices to a predetermined point and, then, by a continued movement of said support, effecting movement of one of the devices at the will of the operator independently of the other.

17. In a tire-building machine, a stitching and trimming mechanism including a stitching-device, a trimming-device operatively associated therewith, a support common to both devices and movable to shift them simultaneously to a predetermined point, a tire forming core associated with said mechanism, means for actuating said support in relation to the core, and means rendered active by a continued movement thereof under the control of the operator to shift one of the devices toward the core independently of the other while the latter remains in engagement with the core.

18. In a tire-building machine, a stitching and trimming mechanism including a stitching-device, a trimming-device operatively associated therewith, a support common to both devices and movable to shift them simultaneously to a predetermined point, means for actuating said support, and means rendered active by a continued movement thereof to shift one of the devices independently of the other, the shifted device thereby being positioned into operating position while the unshifted device remains fixed and then co-operates to hold work operated on by said shifted position.

19. In a tire-building machine, a stitching and trimming mechanism including a stitching-device, a trimming-device operatively associated therewith, a support common to both devices and movable to shift them simultaneously to a predetermined point, means for actuating said support, means rendered active by a continued movement thereof to shift one of the devices independently of the other, the shifted device thereby being positioned into operating position while the unshifted device remains fixed and then co-operates to hold work operated on by said shifted position, and means for varying the extent of independent movement of said shiftable device.

20. A tire-building machine, including a supporting-frame, a pair of arms pivoted thereon, means under the control of the operator for actuating the arms, stitcher-devices carried by said arms, and trimmer-devices also carried by the arms, the stitcher-devices having a movement on the arms independently of the trimmer-devices.

21. A tire-building machine, including a support, a pair of actuating-arms pivoted thereon, a tire-forming core associated therewith, means for actuating the arms in respect to the core, stitcher-devices carried by said arms and positionable thereby into engagement with the core, and trimmer-devices on the arms and movable thereby into engagement with the core while the stitcher-devices are engaged therewith, the trimmer and stitcher devices being relatively movable on the arms.

22. A tire-building machine, including a support, a pair of actuating-arms pivoted thereon, a tire-forming core associated therewith, means for actuating the arms in respect to the core, stitcher-devices carried by said arms and positionable thereby into engagement with the core, trimmer-devices on the arms and movable thereby into engagement with the core while the stitcher-devices are engaged therewith, the trimmer and stitcher devices being relatively movable on the arms, and means for limiting such relative movement of the devices.

23. A tire-building machine, including a support, a pair of actuating-arms pivoted thereon, a tire-forming core associated therewith, means for actuating the arms in respect to the core, stitcher-devices carried by said arms and positionable thereby into engagement with the core, trimmer-devices on the arms and movable thereby into engagement with the core while the stitcher-devices are engaged therewith, the trimmer and stitcher devices being relatively movable on the arms, and means for actuating the stitcher-devices toward their normal position as they are being disengaged from the core.

24. A tire-building machine, including a support, a pair of actuating-arms pivoted thereon, a tire-forming core associated therewith, means for actuating the arms in respect to the core, stitcher-devices carried by said arms and positionable thereby into engagement with the core, trimmer-devices on the arms and movable thereby into engagement with the core while the stitcher-devices are engaged therewith, the trimmer and stitcher devices being relatively movable on the arms, and means for varying the extent of relative movement between said devices.

25. A tire-building machine, including a support, a pair of actuating-arms pivoted thereon, a tire-forming core associated therewith, means for actuating the arms in respect to the core, stitcher-devices carried by said arms and positionable thereby into engagement with the core, trimmer-devices on the arms and movable thereby into engagement with the core while the stitcher-devices are engaged therewith, the trimmer and stitcher devices being relatively movable on the arms, and means active on the trimmer-devices for adjusting the same and thereby vary the depth of cut thereof.

26. A tire-building machine, including a support, a pair of actuating-arms movably mounted thereon, a tire-forming core associated therewith, means for operating the arms comprising links pivotally connected to the arms, an actuating-bar connected to said links, and a spring-controlled foot-lever connected to the bar, a guiding-member for the lever, trimmer-devices adjustably mounted at the upper extremities of the arms and including cutters and means for adjusting the same to vary their cutting function, stitcher-arms movably supported on the actuating-arms, stitcher-disks on the arms, adjustable stops engageable by the stitcher-arms, and springs having a normal tendency to move the arms toward the stops.

28. A tire-building machine, including a support, a pair of actuating-arms movably mounted thereon, a tire-forming core associated therewith, means for operating the arms, comprising links pivotally connected to the arms, an actuating-bar connected to said links, and a spring-controlled foot-lever connected to the bar, a guiding-member for the lever, trimmer-devices adjustably mounted at the upper extremities of the arms and including cutters and means for adjusting the same to vary their cutting function, stitcher-arms movably supported on the actuating-arms, stitcher-disks on the arms, adjustable stops engageable by the stitcher-arms, and springs having a normal tendency to move the arms towards the stops, a base on which said support is movably mounted, and means for shifting the support on the base, whereupon the actuating-arms may be moved in a transverse direction relatively to the core.

In testimony whereof, we have hereunto affixed our signatures.

WILLIAM B. HARSEL.
EDITH ALICE NALL,
*Executrix of the Last Will and Testament of Edward Nall, deceased.*

Witnesses:
 R. S. TROGNER,
 E. C. LEADENHAM.